(12) United States Patent
Nottingham et al.

(10) Patent No.: US 8,316,801 B1
(45) Date of Patent: Nov. 27, 2012

(54) WASTE DISPOSAL SYSTEM FOR CANINES

(75) Inventors: John R. Nottingham, Cleveland, OH (US); John W. Nottingham, Cleveland, OH (US); John W. Spirk, Cleveland, OH (US); Michael O'Toole, Cleveland, OH (US); Steven Tsengas, Cleveland, OH (US)

(73) Assignee: OurPet's Company, Fairport Harbor, OH (US)

( * ) Notice: Subject to any disclaimer, the term of this patent is extended or adjusted under 35 U.S.C. 154(b) by 661 days.

(21) Appl. No.: 12/388,229

(22) Filed: Feb. 18, 2009

Related U.S. Application Data (60) Provisional application No. 61/040,201, filed on Mar. 28, 2008, provisional application No. 61/029,943, filed on Feb. 20, 2008, provisional application No. 61/029,417, filed on Feb. 18, 2008.

(51) Int. Cl.
*A01K 29/00* (2006.01)
(52) U.S. Cl. ..................................... 119/169
(58) Field of Classification Search ............... 119/161, 119/163–165, 169, 174, 451
See application file for complete search history.

(56) References Cited

U.S. PATENT DOCUMENTS

| | | | | |
|---|---|---|---|---|
| 2,380,644 A * | 7/1945 | Grondona | .............. | 242/596.7 |
| 2,938,496 A * | 5/1960 | Wilkerson | .............. | 119/471 |
| 2,983,251 A * | 5/1961 | Lingis | .............. | 119/479 |
| 3,385,266 A * | 5/1968 | Launder et al. | .............. | 119/442 |
| 3,626,899 A | 12/1971 | Spellman | | |
| 4,011,837 A * | 3/1977 | Ksioszk | .............. | 119/164 |
| 4,042,269 A | 8/1977 | Skermetta | | |
| 4,194,658 A | 3/1980 | Tschudin | | |
| 4,270,818 A | 6/1981 | McCahe | | |
| 4,573,750 A | 3/1986 | Golby | | |
| 4,787,334 A * | 11/1988 | Bassine | .............. | 119/165 |
| 4,934,316 A | 6/1990 | Mack | | |
| 5,363,807 A * | 11/1994 | Kakuta | .............. | 119/161 |
| 5,511,513 A | 4/1996 | Baron et al. | | |
| 5,592,900 A * | 1/1997 | Kakuta | .............. | 119/164 |
| 6,059,247 A | 5/2000 | Olivadoti | | |
| 6,164,710 A | 12/2000 | Shibuya | | |
| 6,202,595 B1 | 3/2001 | Atreravi | | |
| 6,205,954 B1 | 3/2001 | Bogaerts | | |
| 6,237,972 B1 | 5/2001 | Jung | | |
| 6,378,461 B1 * | 4/2002 | Thaler et al. | .............. | 119/166 |
| 6,450,119 B1 | 9/2002 | Holt, Jr. | | |
| 6,550,423 B1 | 4/2003 | Pope | | |
| 6,736,466 B1 | 5/2004 | Helland et al. | | |
| D498,025 S | 11/2004 | Tessier et al. | | |
| 6,827,035 B2 * | 12/2004 | Manera | .............. | 119/166 |
| 6,844,058 B2 | 1/2005 | Blum et al. | | |
| 7,024,721 B2 | 4/2006 | McKay | | |

(Continued)

*Primary Examiner* — Richard Price, Jr.
(74) *Attorney, Agent, or Firm* — John D. Gugliotta, P.E., Esq.; Nicholas A. Mihalic, Esq.; Howard L. Wernow (57) ABSTRACT

An automatic pet training pad having a training pad area, an absorbent pad bin and a waste collection bin. A roll of absorbent pad material extends from the absorbent pad bin, across the training pad area and into the waste collection bin. After a pet uses the training pad, a sensor activates a disposal cycle. The used absorbent pad material is withdrawn into the waste collection bin, rolled into a disposable waste pouch, and severed off from the clean absorbent pad material. The absorbent pad comprises an upper, fluid-absorbent layer and a lower, fluid-impervious layer bonded together in a continuous sheet. The absorbent pad material is further impregnated with an odor suppressing substance to control pet waste odor.

24 Claims, 5 Drawing Sheets

U.S. PATENT DOCUMENTS

| | | | |
|---|---|---|---|
| 7,128,023 B2 | 10/2006 | Otsuji et al. | |
| 7,267,381 B2 | 9/2007 | Cafferty et al. | |
| 7,530,524 B2 * | 5/2009 | Wieser et al. | 242/564.4 |
| 2003/0217700 A1 | 11/2003 | Northrop et al. | |
| 2004/0065265 A1 * | 4/2004 | Manera | 119/166 |
| 2006/0225659 A1 * | 10/2006 | Axelrod et al. | 119/164 |
| 2008/0236504 A1 * | 10/2008 | Silverman | 119/169 |
| 2009/0241850 A1 * | 10/2009 | Campbell et al. | 119/164 |
| 2010/0175626 A1 * | 7/2010 | Askinasi | 119/169 |

* cited by examiner

WASTE DISPOSAL SYSTEM FOR CANINES

RELATED APPLICATIONS

The present application claims benefit of the following provisional applications:

U.S. Ser. No. 61/029,417 filed Feb. 18, 2008;
U.S. Ser. No. 61/029,943 filed Feb. 20, 2008; and
U.S. Ser. No. 61/040,201 filed on Mar. 28, 2008.

These applications are incorporated by reference herein as if rewritten in their entirety.

BACKGROUND OF THE INVENTION

1. Field of the Invention

The present invention relates generally to a pet waste disposal system and, more particularly, to an automated pet training pad specifically adapted for canines wherein the automated training pad is capable of automatically disposing pet waste after the pet has used the pad.

2. Description of the Related Art

An important aspect of pet ownership is ensuring that young pets get proper training, especially if they are kept within the owner's home. A particular problem associated with house pets, such as cats and dogs, is teaching the animals the proper place for urination and defecation. Traditionally, owners were faced with seemingly endless cleaning after their pets arbitrarily chose the place to egest.

A number of "self cleaning" cat litter boxes have recently become available that provide for a means of scooping litter clumps from a litter receptacle in a relatively automatic fashion. The more highly automated versions of such devices include motorized scooping that is actuated by a sensor that detects when a cat has entered and left the litter box. The proliferation of such devices currently indicate a consumer need and demand for an easier manner of performing the function of cleaning the litter box. However, to date no such 'automated' collection system has been designed, developed or adapted to accommodate the needs of canines.

Generally, while cats are generally trained maternally in the habit of using a litter box, dog owners usually must engage is 'housebreaking', or developing the habit of urinating and defecating only in certain locations, usually outdoors.

Even after trained, dogs habitually excrete droppings while being walked, requiring the owner to retrieve and dispose of pet wastes when and where the animal has gone. This distasteful routine is familiar to all responsible dog owners and many bystanders. Because of the distastefulness of this routine, many less responsible dog owners leave the waste where it lies. This has led to the promulgation of 'leash laws', in which dog owners are required to retrieve the pet wastes and discharge them appropriately.

Practitioners in the art respond to the problem by proposing means designed to minimize the unpleasantness of the gathering and disposal of such animal waste. Generally speaking, these solutions have developed as improvements around a device term a "pooper-scooper", which is a generic term used to denominate a mechanical apparatus, usually with a long handle, and a cup, bag or other collection end at a distal end. A pooper-scooper is used for retrieving dog wastes without soiling the owners' hands.

In the past few decades, several solutions have become available to pet owners to assist them in training their pets to learn a proper place to egest. The patent to Spellman (U.S. Pat. No. 3,626,899) teaches a training pad comprising an absorbent material lined on one side thereof with fluid impervious material that is further impregnated with an odor imparting substance which attracts young dogs to the pads for the purpose of urination and defecation. The preferred embodiment recites a multi-layer cellulosic absorbent material capable of absorbing aqueous fluids.

In addition to traditional pet training pads, there have been several inventions that attempted to mechanize or automate the process of pet waste disposal. Of considerable relevance is the animal waste disposal system disclosed in U.S. Pat. No. 6,202,595 to Atrcravi, which comprises a drive mechanism that collects waste in a scoop and moves it to a container attached to a removable drawer having two handles so that it can be easily discarded. The device taught in U.S. Pat. No. 6,205,954 to Bogaerts comprises a comb mounted to a movable carriage that pushes waste to a receiving container having a cover lid. The waste container can also be taken off for emptying. The self-cleaning litter box taught in U.S. Application No. 2003/0217700 to Northrop et al. comprises rake tines that push waste clumps upward along an inclined ramp to a waste box having an open lid to receive the clumps. The waste box is fitted with a removable tray and a disposable liner so that the container can be emptied easily.

Although conventional training pads are a welcome solution to everyday problems that owners face while training a young pet, they are nonetheless associated with many drawbacks. The owner still must frequently attend to the training pad to ensure that it is clean. It is important to routinely clean training pads so that the pets do not distribute waste throughout the dwelling. Furthermore, frequent cleaning and replacing of pet training pads is necessary to stop offensive odors from spreading. However, cleaning conventional pet training pads can be a messy affair. Not only are conventional pet training pads inefficient at curbing offensive odors, but they also may be prone to leaking liquid wastes.

Rather than provide continuous incremental improvement in the manual collection and retrieval of outdoor and remotely deposited animal wastes, the present invention takes a completely unique approach in providing for the automatic retrieval, collection, neutralizing and disposal of canine urine and feces with an improved automated pet training and waste collection device that is simple to use, inexpensive to own, and efficient in discarding pet waste and eliminating odor.

Consequently, a need has been long felt for providing an improved automated pet training pad that is simple to use, inexpensive to own, and efficient in discarding pet waste and eliminating odor.

SUMMARY OF THE INVENTION

It is an object of the present invention to provide an improved automated pet training pad and, more specifically, an automated pet training pad capable of automatically disposing pet waste after the pet has used the pad.

It is another object of the present invention to provide a pet waste disposal system specifically adapted for canines capable of automatically disposing pet waste.

Yet another object of the present invention is to provide an automated pet training pad that is simple to use, inexpensive to own, and efficient in discarding pet waste and eliminating odor.

It is a feature of the present invention to utilize an mechanism for collecting pet wastes that is specifically adapted for use with puppy's and small dogs.

It is a feature of the present invention to utilize an absorbent pad material that is impregnated with an odor-suppressing substance to control pet waste odors.

It is another feature of the present invention to include a waste container comprising a removable cover that protects the disposal mechanism.

Further, the present invention utilizes absorbent pad material that is impregnated with an odor-suppressing substance to control pet waste odors, and include a waste container comprising a removable and disposable.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

First Embodiment

Figure 1:
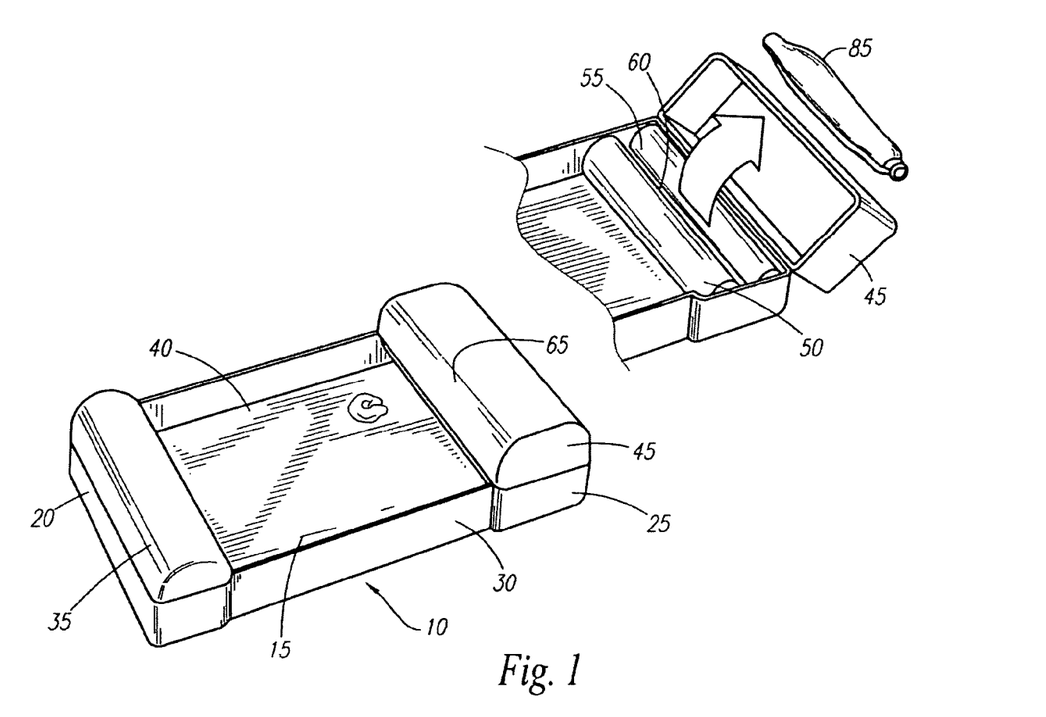
FIG. 1 is an elevational isometric view of the automated pet training pad according to the first preferred embodiment of the present invention.

As illustrated in FIG. 1, an automated pet training pad 10 according to the preferred embodiment of the present invention is shown. To achieve the objectives of the present invention, the preferred embodiment comprises a deep rectangular training pad area 15, an absorbent pad bin 20, and a waste collection bin 25.

The exterior of the automated pet training pad 10 is generally rectangular in shape, although other shapes, especially of the artistic and/or themed variety, are not precluded. The training pad area defines the space for pet urination and defecation. The absorbent pad bin 20 and the waste collection bin 25 extend from two opposing sides of the training pad area 15. The training pad area 15 may have a raised wall 30 extending vertically on the two sides not interfaced by the absorbent pad and waste collection bins, 20 and 25, respectively. The wall 30 is low enough so it does not present a significant barrier to a pet attempting to enter the training pad area 15. The advantage of this feature is that it helps contain the solid waste within the training pad area 15. The raised wall 30 surrounds the flat bottom area of the training pad area 15 which defines the space for pet urination and defecation.

The exterior of the automated pet training pad 10 is preferably manufactured from a rigid and resilient plastic material, such as ABS. Alternatively, the exterior of the training pad may be manufactured from sheetmetal, although other alternative materials are not precluded. In addition to being available in a variety of attractive colors, the exterior of the automated training pad 10 may also have various graphics associated with it.

The absorbent pad bin 20 houses a absorbent pad roller (not shown) on which a roll of absorbent material is positioned. The absorbent pad bin 20 features a removable cover 35 that protects the roll of absorbent pad material 40. The removable cover 35 may either be hinged to the automated training pad 10, or be completely removable from the same. The absorbent pad material 40 is fed from the absorbent pad bin 20 and inserted along the bottom of the training pad area 15.

The waste collection bin 25 is a rectangular area that houses waste disposal components. A removable waste collection bin cover 45 is hinged on the exterior wall of the waste collection bin 25 to permit convenient access to the waste disposal components. The waste collection bin 25 further features a waste collection roller 50 that receives the absorbent pad material 40. The roller is mechanically coupled to a motor mechanism 55 which is capable of rotating the roller 50. In an alternate embodiment to the present invention, a hand crank mechanism (not shown) may be utilized instead of a motor 55.

The waste collection bin 25 also houses a cutting mechanism 60 capable of severing the used section of absorbent pad material 40 from the clean section of absorbent pad material 40. Additionally, the waste collection bin 25 comprises a motion sensor 65 located on the removable lid 45. The purpose of the motion sensor 65 is to sense when the pet enters and leaves the training pad area 15, and correspondingly control the operation of the cleaning cycle.

The absorbent pad material 40 is preferably a multi-layered absorbent material that is commercially available. The upper side of the absorbent pad 70 features an absorbent material capable of absorbing and retaining liquid waste. The material is preferably selected from a cellulosic group of materials with adequate fluid sorbency characteristics, although other similar materials known in the art are not precluded.

The absorbent pad material may be structured by forming multiple layers of absorbent material that are bonded to the fluid impervious lower layer. Alternatively, an absorbent core (not shown) may be disposed between the upper absorbent layer 70 and the lower, fluid impervious layer 75. The absorbent core would have increased fluid-retaining capacity compared to a single upper absorbent layer. The absorbent core material may comprise a foam, gel, or any other material known in the art with adequate fluid sorbency characteristics. Additionally, the absorbent pad material 40 may be impregnated with an odor control substance to help stop the spreading of offensive odors.

Figure 2:
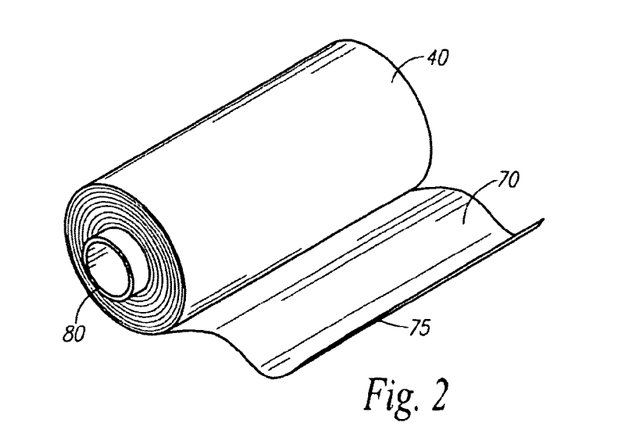
FIG. 2 is a detailed illustration of the absorbent pad material roll used with the automated training pad according to the first preferred embodiment of the present invention.

The upper absorbent layer 70 comprises the top surface of the training pad area. The upper absorbent pad's 70 function is to serve as a urination and defecation area for the pet. The upper absorbent pad layer 70 and lower, fluid-impervious layer 75 are bonded together to form an inseparable, continuous sheet. The absorbent pad is also flexible enough to be formed in a roll 80. As illustrated in FIG. 2, a roll of absorbent pad material 80 is dimensioned such that it can be removably inserted into the absorbent pad bin 20 without any modification. The roll of absorbent pad material 80 contains a quantity of absorbent material 40 that is sufficient for a large number of uses without the need for replacement. The absorbent pad material 40 is preferably made from a biodegradable material that is easy and safe to dispose.

Second Embodiment

As illustrated in FIGS. 3-8, an automated pet training pad 10a according to the second preferred embodiment of the present invention is shown. While similar in broad concept to an automated pet training pad 10 according to the first embodiment of the present invention, to achieve the objectives of the present invention of specifically adapting an indoor waste disposal system for use with puppies or small adult canines, the preferred embodiment comprises a deep rectangular training pad area 15a that provides an waste control cartridge 85 removably housed within an outer housing covering 90. The outer covering 90 can form a decorative outer top, and further can support a plurality of spray shields, shown herein as a rear spray shield 90a and a pair of opposed side spray shields 90b. While the training pad area 15a comprises a generally horizontal surface that can be flat or slightly inclined toward a central gap 95 will provide an adequate target surface for female canines that squat to urinate and defecate, the spray shields 90a, 90b may be required to direct a urine spray from a male canine that instinctively will lift a leg in order to urinate. While the central gap 95 can be of a fixed width, it is anticipated that it can easily be made to adjust.

Figure 3:
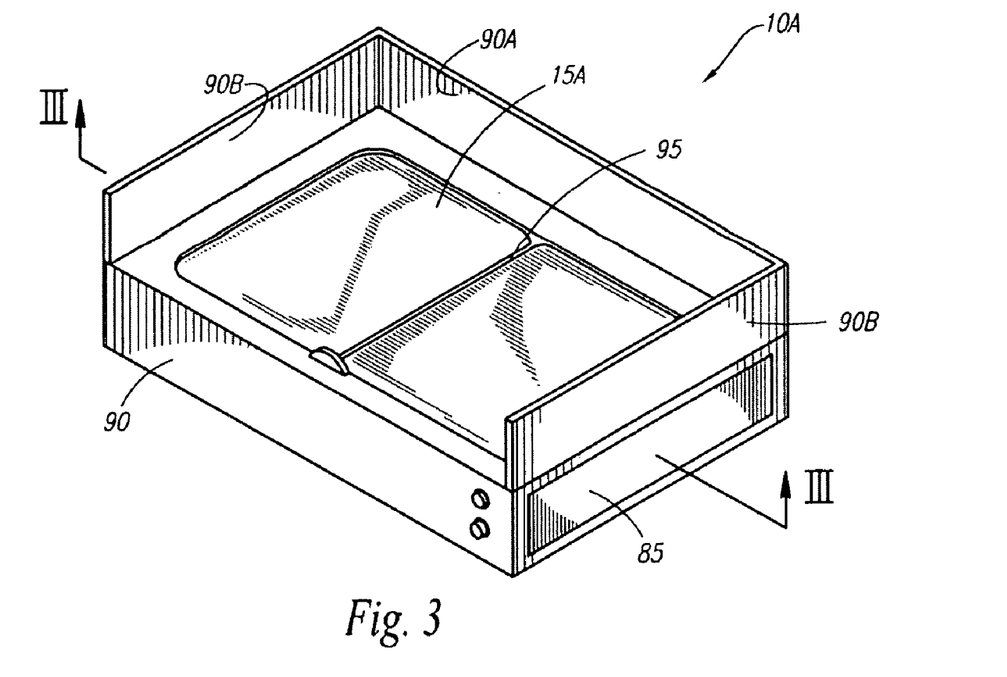
FIG. 3 is a perspective view of the automated pet training pad according to the second preferred embodiment of the present invention.

The exterior of an automated pet training pad 10a is generally rectangular in shape, although other shapes, especially of the artistic and/or themed variety, are not precluded. The training pad area defines the space for pet urination and defecation. A means for sensing when the training pad area has been used, such as an infrared sensor 65a, is positioned at the front of the housing 12a such as to be capable of directing its detection within the spray shields 90a and 90b and otherwise minimize false detection.

The exterior of an automated pet training pad 10a is preferably manufactured from a rigid and resilient plastic material, such as ABS. Alternatively, the exterior of the training pad may be manufactured from sheetmetal, although other alternative materials are not precluded. In addition to being available in a variety of attractive colors, the exterior of an automated pet training pad 10a may also have various graphics associated with it.

Figure 4:
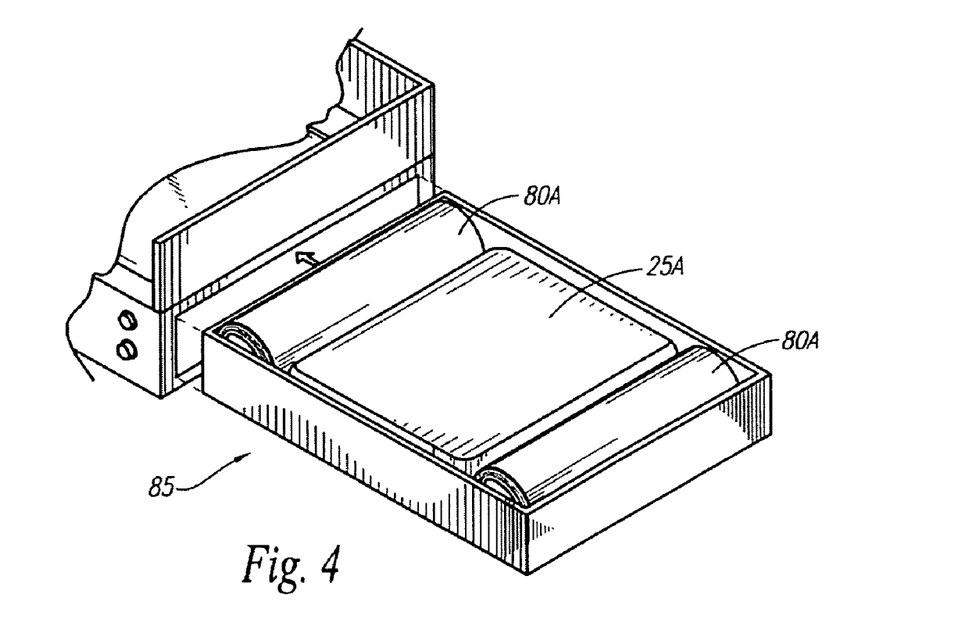
FIG. 4 is a partially exploded perspective view of a removable waste control cartridge for use with the second preferred embodiment of the present invention.

As shown in greater detail in conjunction with FIG. 4, the waste control cartridge 18 is shown in a basic exemplary design in which a pair of absorbent pad collection rolls 80a and a waste disposal receptacle 25a are adapted to be removable from the housing 20a. It is anticipated that this cartridge 18 can be designed as a reusable, durable mechanism, or adapted as a disposable element in which an outer sleeve can encapsulate the entire cartridge for disposal. In a durable, reusable form, the waste compartment 25a would be also be removable for disposal of collected waste. In any embodiment, it is anticipated that the waste collection compartment 25a would need to be formed of water resistant materials or have an otherwise liquid impermeable surface.

In either event, the cartridge (entire or waste only, respectively) can be collected and easily disposed without the need for the user to contact the pet waste directly.

Figure 5:
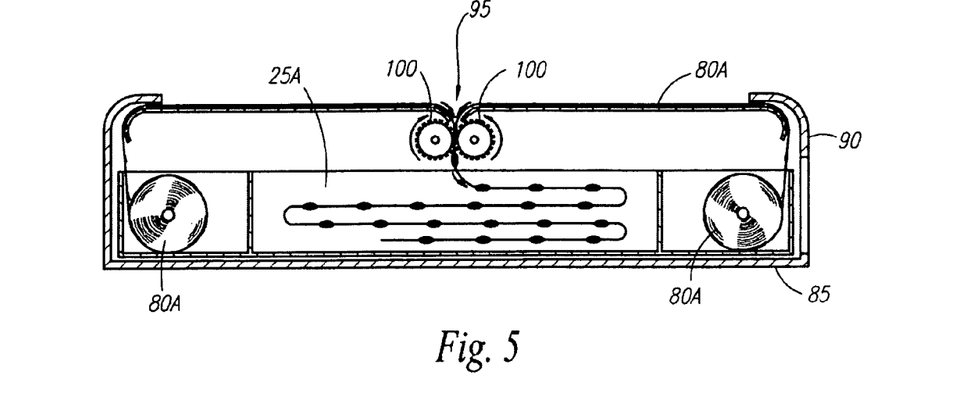
FIG. 5 is a cross-sectional elevational view taken across the line III-III of FIG. 3.

As shown in greater detail in conjunction with FIG. 5, the functional mechanism of the waste control cartridge 18 is shown in greater detail. As shown in a manner that would enable one skilled in the art to practice the present invention, a pair of absorbent pad collection rolls 80a are rotatably mounted to feed a lead of absorbent collection pads 40a onto the training pad area 15a. Such a configuration allows for the use of a simple, low costs fixed drive system in which each roll 80a is moved in a synchronized fashion such that each pad 40a is drawn into the central gap 95. Although a limitation on any particular type of drive system would not limited the teachings or functionality of the present invention, for purposes of enabling a disclosure, the use of counter rotating drive sprockets 100 are shown in conjunction with FIG. 6 as pulling each respective collection pad 40a from its respective roll 80a and pinching them together at the central gap 95. In this manner, the soiled training pad area 15a are collected and isolated as described in greater detail below.

The waste collection bin 25a is an opened top area that houses waste disposal components. Sealed and soiled training pads 40a are fed down through the central gap 95 by the sprockets 100 and are collected for future disposal.

Figures 6, 7, 8:
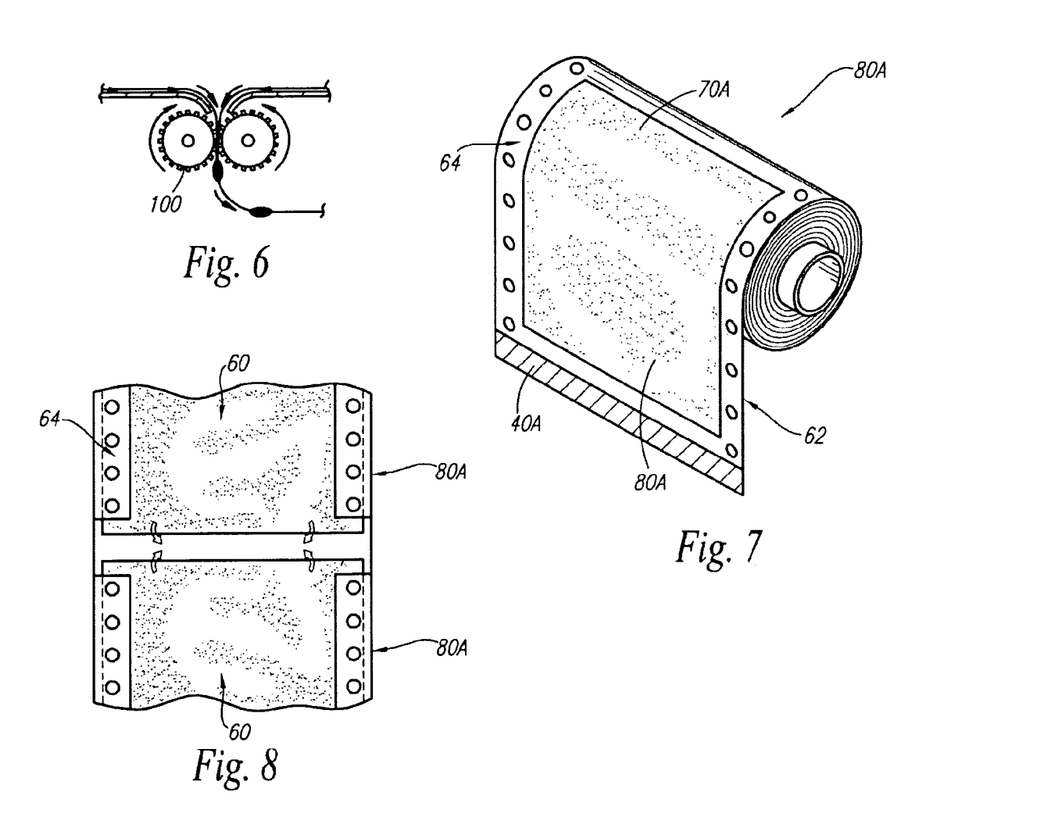
FIG. 6 is a detailed elevational view of counter rotating drive sprockets shown pulling respective collection pad and pinching them together at the central gap.
FIG. 7 is a perspective view of a rolled absorption pad for use with the second preferred embodiment of the present invention.
FIG. 8 is a detailed top plan view of the absorption pad of FIG. 6.

Referring now to FIGS. 5 and 6, the overall operation of an automated pet training pad 10a and its waste control cartridge 18 can be better understood with a detailed description of the absorbent pad collection rolls 80a. Each roll 80a is anticipated as being formed of a linearly aligned series of individual absorbent collection pads 40a having a series of demarcated pad surfaces 70a mounted to an impervious backing 75a. When adapted for use with the sprocket drive mechanism 100 as described above, the sides of each pad 40a form a tractor guide 105 in which a series of aligned, equally spaced orifices for receiving the rotating sprockets 100 and thereby urge the rolls to travel as described. Similarly, a frictional roller drive is anticipated in which a solid, non-perforated guide 110 would be sufficient.

The absorbent pad material 40a is preferably a multi-layered absorbent material that is commercially available. The upper side of the absorbent pad 70a features an absorbent material capable of absorbing and retaining liquid waste. The material is preferably selected from a cellulosic group of materials with adequate fluid sorbency characteristics, although other similar materials known in the art are not precluded.

The absorbent pad material may be structured by forming multiple layers of absorbent material that are bonded to the fluid impervious lower layer 75a. Alternatively, an absorbent core (not shown) may be disposed between the upper absorbent layer 70a and the lower, fluid impervious layer 75a. The absorbent core would have increased fluid-retaining capacity compared to a single upper absorbent layer. The absorbent core material may comprise a foam, gel, or any other material known in the art with adequate fluid sorbency characteristics. Additionally, the absorbent pad material 40a may be impregnated with an odor control substance to help stop the spreading of offensive odors.

The upper absorbent layer 70a comprises the top surface of the training pad area. The upper absorbent pad's 70a function is to serve as a urination and defecation area for the pet. The upper absorbent pad layer 70a and lower, fluid-impervious layer 75a are bonded together to form an inseparable, continuous sheet. An adhesive seal 115 located at the leading edge of each pad segment 40a and along the sides, such as adhesive tape, to form a circumscribing seal of any animal wastes within the pair of absorbent pads 40*a*.

Third Embodiment

Figure 9:
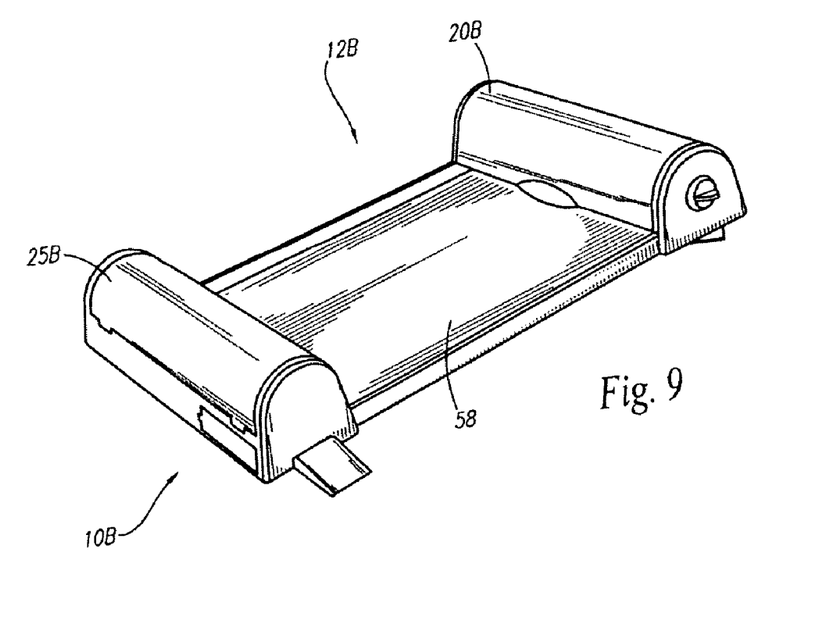
FIG. 9 is an elevational view of an indoor pet waste disposal system according to the third preferred embodiment of the present invention.
Figure 10:
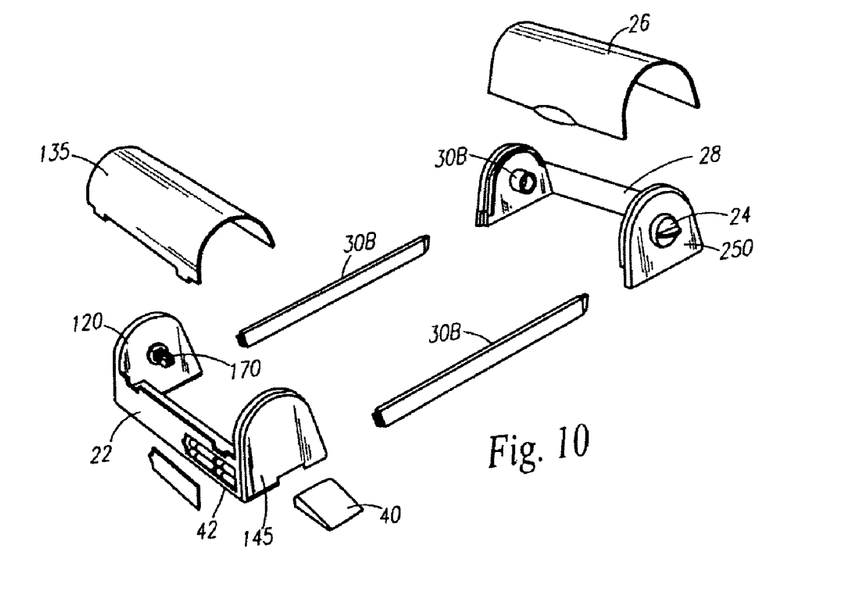
FIG. 10 is an exploded view of a housing for the waste disposal system of FIG. 9; and, FIG. 11 is an exploded view of the housing and the waste pad roll as used with the third preferred embodiment of the present invention.
Figure 11:
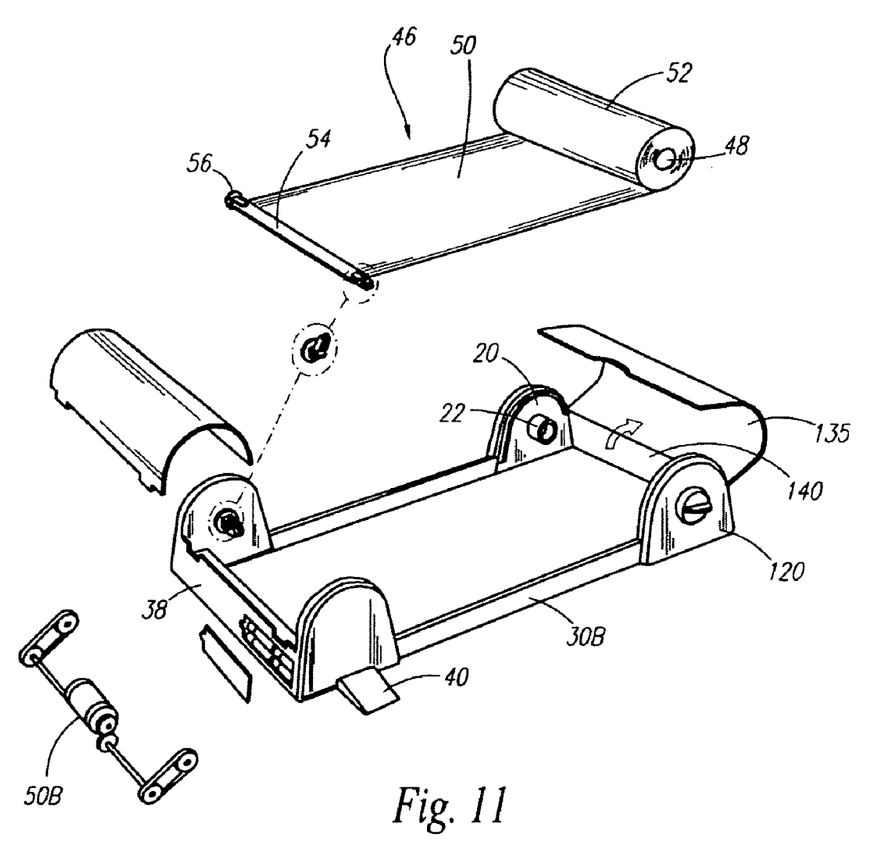

An automated pet training pad 10*b* is shown in FIGS. 9-11 in accordance with a third preferred embodiment of the present invention. The waste disposal system is placed in a same location as conventional litter boxes, wherein a small breed dog is able to freely use the pad as an alternative to being let out. The automated pet training pad 10*b* system includes a housing 12*b* that contains a limited length of exposed, flat waste pad dispensed from a roll in a supply cabinet 20*b* while an equal, soiled length of pad is wrapped about a take-up roller in a containment cabinet 25*b*.

An exploded view of the housing 12*b* is shown in FIG. 10. Extruded side supports 30*b* affix to the supply cabinet 20*b* and the containment cabinet 25*b*, thus making the both parts of one continuous body. The extruded side supports 30*b* affix to support arms 120 of the supply cabinet 20*b*. A pet pad roll fits over integrally attached support members 125 which protrude from the inner sidewalls of the support arms 120. A spring loaded axle 130 is positioned opposite the support member on an exterior side of at least one support arm 120. The spring loaded axle 130 is a knob-like structure, a rotation of which initiates a feed of the supply roll.

A door 135 is hingedly affixed to a rear wall 140, and it closes over the supply roll suspended in the supply cabinet 20*b*. The door 135 is shown to follow a curvature of a roll, wherein peripheral edges of the support arms 120 follow that same curvature; however, there is no limitation taught herein to a shape and to curvature of components that make up the supply cabinet 20*b* structure.

The containment cabinet 25*b* is attached to an opposite end of the extruded side supports 30*b*. The containment cabinet 25*b* is similarly formed by two containment support arms 145 each attached to opposing ends of a containment rear wall 140. A similar door 135 is hingedly affixed to open and close about a length of that rear wall 140. The door closes to contain a wind-up roll of soiled pet pad. The wind-up roll (not shown in FIG. 10) is driven by a motor and gear assembly 55*b* (FIG. 11) housed in a motor-gear housing 150 within the containment cabinet 25*b*. A dual-sided belt drive motor 155 is activated by means of a foot pedal 160 on an exterior of the housing 12*b*. Batteries (disposable or rechargeable) are contained in a power source compartment 165 accessed at a rear exterior of the housing 12*b*.

Rotating clips 170 are comprised on the interior sidewalls of the containment support arms 145. These clips 170 receive corresponding clip attachments on a pet pad roll to initiate a wind-up roll. The rotating clips 170 pivot upwards to release the spent roll when the supply roll depletes. The soiled portions of the pet pad roll are always contained in the containment cabinet 25*b* until the entire soiled roll is discarded.

The present automated pet training pad 10*b* further includes pet pad rolls. A supply roll, i.e., a pet pad roll not soiled, comprises a roll of absorbent pad 40*b* wrapped around a biodegradable tubing 80*b* (s.a., e.g., a cardboard tube). The absorbent pad 40*b* is similar to training pads, wherein an absorbent layer 70*a* is backed by a moisture barrier 75*a* layer; however, it is not perforated into a plurality of sheets. The absorbent pad 40*b* is a continuous sheet of padding rolled about the tubing 80*b*. A cardboard take-up strip 175 is affixed across the length of the distal end of the absorbent pad 40*b*.

Clip attachments 180 are comprised at opposing ends of the take-up strip 175. These clip attachments 180 are received in the corresponding clips 170 comprised on the containment support arms 145.

The take-up strip 175 functions as a wind-up roll when soiled pad is wound around it. When the supply roll depletes, the clips 170 flip upwards so the soiled roll can be removed from the containment cabinet 25*b* and discarded. The impervious moisture backing layer is exposed while the absorbent pad faces inwards of the roll.

To use the present invention, the doors 135 comprised on the respective supply and containment cabinets, 20*b* and 25*b* respectfully, are opened. A supply roll of continuous pet waste pad 40*b* is placed in the supply cabinet 20*b*. Tubing 80*b* of the supply roll are received by the support members 125 on the inner sidewalls of the support arms 120. The cardboard take-up strip 175 is grabbed and pulled across a length of the housing such that a dependent length of flat, waste pad becomes accessible to the pet. The flat waste pad lies between the extruded side supports 30*b*. The clip attachments 180 on the take-up strip 175 are pushed into the clips 170 on the containment support arms 145. The doors 135 of the cabinets 20*b* and 25*b* are closed.

When a pet steps onto the exposed, dependent waste pad portion 40*b*, any liquid relieved by the pet is absorbed by the absorbent portion of the pad 70*a*. Any droppings are left on the pad until the owner visits the automated pet training pad 10*b*. The pet's owner first manually picks up any droppings and discard them immediately. The pet owner then steps on the foot pedal 160 to activate the motor assembly 55*b*. The motor 155 causes the rotating clips 170 to spin such that the soiled pad wraps around the take-up strip 175. The soiled pad travels through a slot created between the containment cabinet door 135 and the ground. The length of soiled pad wrapped around the take-up strip 175 is equal to the length of pad pulled from the supply roll in the supply cabinet 20*b*. The motor assembly 55*b* causes a length of pet pad to be pulled from the supply roll as it wraps soiled pad from the exposed, dependent length around the wind-up roll. The clean waste pad length pulled from the supply roll replaces the soiled length between the extruded side supports.

When the supply roll is depleted, the rotating clips 170 pivot/flip 90-degrees so that the clip attachments 180 on the soiled wind-up roll are released. The soiled pad can be grabbed and carried to a waste basket. The absorbent pad portions face inwards the roll so that no urine is exposed to the user.

2. Operation of the Preferred Embodiment

First Embodiment

The preferred embodiment of the present invention operates by means of a motorized driving mechanism 55. It is envisioned that a pet enters the training pad area 15 to egret waste material. After the pet leaves the automated pet training pad 10, the sensor 65 takes notice of the vacancy and initiates the waste disposal process. A motor 55 in the waste collection bin 25 engages the roller mechanism 50 which unwinds the absorbent pad material 40.

As the roll of the absorbent pad material 80 unwinds, the used training pad section is withdrawn into the waste disposal bin, being replaced with a clean section of the absorbent pad material 40. Inside the waste collection bin 25, the used training pad section is rolled into a disposable waste pouch 190. The fluid impervious layer 75 of the absorbent training pad material 40 that was once on the bottom of the training pad area 15 is now on the exterior of the pouch 85. This prevents any waste material from leaking out and allows the user to freely contact the disposable waste pouch 85 without the risk of contamination. The pouch 85 is then severed off from the rest of the absorbent pad material 40 via a cutting mechanism 60. Alternatively, the used absorbent pad material 40 may be torn off from the clean absorbent pad 40 along a perforated line (not shown). The disposable waste pouch 190 is sealed around the edges to prevent waste materials from spilling out. The disposable waste pouch 190 is finally discarded in an appropriate manner.

After this cycle is complete, the automated pet training pad 10 is ready for subsequent pet use. By using the present invention according to its preferred embodiment, the pet owner is relieved from a messy chore of cleaning up after their pet. Additionally, the pets benefit from the present invention by always having a clean area to egret waste.

Second Embodiment

In operation, the automated pet training pad 10a is anticipated as being used initially with puppies in order to develop the habit of using the rectangular training pad area 15a as a location for urination or defecation. Upon actuation, the soiled training pads 40a are pulled toward the central gap 95 by the sprockets 100 and are sealed and fed down through where they are collected in the waste collection compartment 25a for future disposal. The waste collection compartment 25a collects the sealed and soiled waste collection pads within the waste control cartridge 18. As described above, cartridge 18 can be sized and adapted entirely of biodegradable materials such as to form a completely disposable unit when spent, or alternatively the absorbent pad collection rolls 80a can merely be replaceable and the waste collection compartment 25b removeable, cleanable and replaceable.

As the roll of the absorbent pad material 40a unwinds, the used training pad section is drawn into the waste disposal bin, being replaced with a clean section of the absorbent pad material 40a. Inside the waste collection bin 25b, the used training pad section is collected. A fluid impervious layer 75a of the absorbent training pad material 40a that was once on the bottom of the training pad area 15a is now on the exterior of a pouch that prevents any waste material from leaking out and allows the user to freely contact the disposable waste pouch without the risk of contamination.

After this cycle is complete, the automated pet training pad 10a is ready for subsequent pet use. By using the present invention according to its preferred embodiment, the pet owner is relieved from a messy chore of cleaning up after their pet. Additionally, the pets benefit from the present invention by always having a clean area to egret waste.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An automated pet waste collection system comprising:
   a rectangular training pad area having a flat bottom portion defining the area for pet urination and defecation;
   an absorbent pad bin and a waste collection bin integrally coupled to said training pad area, wherein said absorbent pad bin and said waste collection bin are located on opposite ends of said training pad area;
   a housing that exposes a limited length of dependent flat waste pad sheet dispensed from a supply waste pad roll housed in a supply cabinet, wherein an equal, soiled length of pad is wrapped about a take-up roll in an opposite containment cabinet, wherein said pad sits atop said training pad area; said waste pad is formed of a multi-layer absorbent material having an upper side of an absorbent material capable of absorbing and retaining liquid waste; and a fluid impervious lower layer
   said housing comprising: at least one cutting mechanism; at least one spray shield; extruded side supports affixed to said supply cabinet at a first end and said containment cabinet at said opposing end; support arms affixed to said extruded side supports, said support arms form sidewalls to said supply cabinet; containment support arms affixed to said extruded side supports, said containment support arms form sidewalls to said containment cabinet; a supply door hingedly affixed to a rear wall of said support cabinet, said supply door closes over said supply roll suspended in said supply cabinet; a containment door hingedly affixed to a rear wall of said containment cabinet, said containment door closes over said take-up roll suspended in said containment cabinet;
   wherein a dependent length of flat, waste pad lies between said extruded side supports;
   said absorbent pad bin features an absorbent pad roller capable of accenting a roll of absorbent pad material
   said waste collection bin features a waste collection roller capable of accepting a roll of absorbent pad material;
   a motor mechanism associated with the waste collection bin capable of engaging said roller in said waste collection bin.

2. An automated pet waste collection system according to claim 1, wherein said training pad area further features a raised wall portion extending on the sides not integrally coupled with said absorbent pad bin and said waste collection bin.

3. An automated pet waste collection system according to claim 1, further comprising an absorbent pad material having an upper, fluid-absorbent upper layer and a lower, fluid-impervious layer, wherein said upper and lower layers form a continuous and inseparable sheet.

4. An automated pet waste collection system according to claim 3, wherein said absorbent pad material is flexible and capable of being formed into a roll, wherein said role extends from the absorbent pad bin to the waste collection bin along the bottom of the training pad area.

5. An automated pet waste collection system according to claim 3, wherein said absorbent pad material is impregnated with an odor control substance to help stop the spreading of offensive odors.

6. An automated pet waste collection system according to claim 1, further comprising a hand-crank mechanism associated with the waste collection bin capable of engaging said roller in the waste collection bin.

7. An automated pet waste collection system according to claim 6, where said cutting mechanism capable of severing the absorbent pad material.

8. An automated pet waste collection system according to claim 6, further comprising a cutting mechanism capable of severing the absorbent pad material.

9. An automated pet waste collection system according to claim 1, further comprising a motion sensor capable of sensing when the pet enters and leaves said training pad area, and correspondingly controlling the motor mechanism.

10. An automated pet training pad of claim 1, said waste control bin further comprises:
   a pair of absorbent pad collection rolls rotably mounted to feed a lead of absorbent collection pads onto the training area; and
   a drive system for rotating each roll in a synchronized fashion such that each pad is drawn into a central gap.

11. An automated pet training pad of claim 10, wherein said drive system comprises counter rotating drive sprockets for pulling each respective collection pad from its respective roll and pinching them together at the central gap such that the soiled training pad area is collected and isolated.

12. An automated pet training pad of claim 11, each absorbent pad collection roll is formed of a linearly aligned series of individual absorbent collection pads having a series of demarcated pad surfaces mounted to an impervious backing and adapted for use with said sprocket drive mechanism.

13. The indoor pet waste disposal system of claim 11, wherein said absorbent pet pad collection roll fits over integrally attached support members which protrude from inner sidewalls of said support arms.

14. The indoor pet waste disposal system of claim 11, further comprising a spring loaded axle opposite said support members on an exterior side of at least one of said support arms, said spring loaded axle is a knob-like structure, a rotation of which initiates a feed of the supply roll.

15. The indoor pet waste disposal system of claim 11, wherein said take-up roll is driven by a motor and gear assembly housed in a motor-gear housing within said containment cabinet.

16. The indoor pet waste disposal system of claim 11, further comprising a foot pedal that activates a dual-sided belt drive motor on an exterior of said housing.

17. The indoor pet waste disposal system of claim 11, further comprising a power source compartment on a rear exterior of said containment cabinet, said power source compartment receives a power source to power a motor assembly that drives said take-up roll.

18. The indoor pet waste disposal system of claim 11, further comprising rotating clips on interior sidewalls of said containment support arms, said clips receive corresponding clip attachments on a pet pad roll to initiate said take-up roll.

19. The indoor pet waste disposal system of claim 18, wherein said rotating clips pivot upwards to release a spent supply roll when said supply roll depletes and said soiled portions of the pet pad roll are always contained in the containment cabinet until the entire soiled roll is discarded.

20. The indoor pet waste disposal system of claim 18, wherein said rotating clips flip 90 degrees such that when said supply roll depletes, said rotating clips flip upwards so a spent roll can be removed from said containment cabinet and discarded.

21. The indoor pet waste disposal system of claim 11, wherein said supply roll a continuous sheet of absorbent waste pad wrapped around a tubing, said absorbent waste pad comprises an absorbent layer backed by an impervious moisture barrio.

22. The indoor pet waste disposal system of claim 21, wherein said supply roll further comprises a cardboard take-up strip affixed across a length of a distal end of the absorbent pad, said take-up strip functions as a wind-up roll when soiled pad is wound around it.

23. The indoor pet waste disposal system of claim 22, wherein said supply roll further comprises clip attachments at opposing ends of said take-up strip, said clip attachments are received in corresponding rotating clips comprised on said containment support arms.

24. The indoor pet waste disposal system of claim 21, wherein said impervious moisture backing faces outwards a spent roll while said absorbent pad faces inwards of said spent roll.

* * * * *